2,765,345
PREPARING POLYCHLOROMONOTHIOPHENOLS

Josef Pikl, Glassboro, N. J., assignor to E. I. du Pont de Nemours and Company, Wilmington, Del., a corporation of Delaware No Drawing. Application March 31, 1953,
Serial No. 346,020

4 Claims. (Cl. 260—609)

This invention relates to a process for preparing chlorothiophenols which are peptizing agents for use in elastomers and intermediates for use in preparing other chemicals. The invention includes the preparation of tetrachlorothiophenol, which is a new compound.

The best general methods for making aromatic mercaptans consist of either reducing the corresponding disulfides prepared with sulfur monochloride or reducing the corresponding sulfonyl chlorides with zinc and acid. These methods, however, are not satisfactory for the preparation of polychlorothiophenols. Aromatic mercaptans can also be prepared from the appropriate diazonium salt by reaction with potassium ethyl xanthate, which after warming and finally hydrolyzing, yields the thiophenol. This procedure, however, often leads to violent explosions. These processes are cumbersome, requiring several steps from the raw material to the desired thiophenol. In general, compounds prepared by these methods are expensive and not commercially attractive. In order to make these polychlorothiophenols available as peptizing agents for rubber, an economical process for their preparation is needed.

A review of the art indicates that the action of sodium sulfide or sodium sulfhydrate on nuclear substituted halogen substituted benzenes has not found general application in the preparation of thiophenols. While it is known that this method can be used in preparing aliphatic mercaptans, the process as heretofore suggested is not satisfactory on aromatic halides, apparently due to lower reactivity of the nuclear attached halogen. Much higher reaction temperatures are therefore required for the reaction to occur with the aromatic halides and these higher temperatures, in turn, favor unwanted side reactions. For example, in the reaction of halogenated benzenes with sodium sulfide, very impure compounds are obtained. Where the nuclear substituted halogen is activated by other substituents, particularly by nitro groups, the reaction with alkali-sulfhydrates does occur, to give the correspondingly substituted thiophenols.

It is the object of this invention to provide a simple and economical process for preparing chlorothiophenols containing from 2 to 5 chlorine and from 1 to 2 thiol groups which are of particular use as peptizing agents for rubber, and to prepare the heretofore unknown tetrachlorothiophenol. It is a further object to produce the zinc salt of the polychlorothiophenols which are also useful as peptizing agents for rubber.

I have found that chlorobenzenes containing at least 4 chlorine atoms can be reacted with an alkali metal sulfhydrate where the reaction is carried out in a solvent or mixture of solvents which dissolve a substantial amount of the reacting ingredients. The reaction can be completed in from 1 to 12 hours when carried out at temperatures of from 100° to 170° C. The products are isolated by drowning in water and distilling off the solvents. The remaining solution of the alkali metal salt of the thiophenol can be filtered to remove insoluble material that precipitates from the aqueous solution, and the chlorothiophenols can then be precipitated with acid or they may be converted to the zinc salts, which are desirable peptizing agents for rubber, and isolated as such.

For converting the chlorothiophenols into the zinc salt, the solution is filtered and heated with zinc oxide. This converts the excess sulfhydrate into zinc sulfide and the resulting mixture is reacted with zinc sulfate until all of the alkali salt of the thiophenol is converted to the corresponding zinc salt. The desired product is then filtered off and dried.

The polychlorobenzenes that can be converted to the thiophenols are those containing 4 or more nuclear attached chlorine atoms, i. e., tetra-, penta- and hexachlorobenzene. When less than four chlorine atoms are present, the reaction does not occur. The hexachlorobenzene reacts most rapidly and the tetrachlorobenzene reacts the slowest while the pentachlorobenzene is intermediate in reaction rate between the two when using similar conditions. When a tetrachlorobenzene is used for reaction with sodium sulfhydrate, the final product will be a monothiol or a dithiol depending upon the isomer used. Thus, when 1,2,3,4-tetrachlorobenzene is used, the product is predominantly a trichlorothiophenol, but when 1,2,4,5-tetrachlorobenzene is used, the product is essentially a dichlorophenyldithiol. There is often formed with the desirable chlorothiophenols small amounts of chlorodithiophenols, but since these compounds are also active rubber peptizing agents they need not be separated from the final reaction product. Methods for purifying the monothiols are given in the following examples.

Of the alkali sulfhydrates, the sodium sulfhydrate is preferred, although the potassium or ammonium sulfhydrates may be used. The 70% flaked commercial sodium sulfhydrate is satisfactory. It has been found that the mol ratio of the sodium sulfhydrate to the polychlorobenzene is important in determining yield and in giving products containing little or no dithiophenol. With a low mol ratio of sodium sulfhydrate to hexachlorobenzene (that is, 1.5:1) a lower conversion results and relatively larger amounts of dithiol derivatives are formed than at higher mol ratios (that is, 2.5:1), when a practically quantitative conversion to the pentachlorothiophenol may be obtained. This is quite surprising as the opposite results would normally be expected; that is, high sulfhydrate ratios would be expected to produce dithiols. The preferred molar ratio of the sulfhydrate to the polychlorobenzene is from 2:1 to about 3:1, as illustrated in the following examples.

Also of importance is the purity of the sulfhydrate. It has been found that when the sodium sulfhydrate contains polysulfides the products resulting from this process are high in sulfur content and thus contain appreciable amounts of dithols. Thus, if monothiols are desired, alkali sulfhydrate containing little or no polysulfide should be used.

The preferred solvent for carrying out this process is methanol, but many other organic solvents are operative. The function of the solvent is to permit solution of the alkalisulfhydrate, and bring it in intimate contact with the polychlorobenzene. The solvent is one in which both reactants are soluble at the temperatures employed. Other alcohols such as ethyl alcohol, isopropyl alcohol, n-butyl alcohol and ethylene glycol may be used, as well as other water soluble solvents such as pyridine. Solvent mixtures are suitable, particularly where they are soluble in each other and in which mixture the reactants are soluble, such as mixtures of ethylene glycol with benzene, xylene, toluene, etc.

When a low boiling alcohol is employed as solvent, the reaction is best carried out in a closed system under autogenous pressure. This is the preferred procedure, but reaction at atmospheric pressure also gives the desired product.

The polychlorothiophenols herein described, and their zinc salts, are of particular value as odorless, non-toxic, peptizing agents for natural and synthetic rubbers.

The following examples are given to illustrate the invention. The parts used, unless otherwise specified, are by weight.

*Example 1*

A mixture of 43 parts of hexachlorobenzene, melting point 227° C., 32.4 parts of sodium sulfhydrate (70% flaked commercial material) and 90 parts of methanol are heated in a steel pressure vessel for 12 hours at 120° C. After cooling to room temperature the reaction product is discharged into 75 parts of water and most of the methyl alcohol is distilled over, 80 parts of distillate being collected. The dark colored solution is filtered from a small amount of a mixture of unreacted hexachlorobenzene and a purple colored organic compound containing iron and sulfur. It is then treated for 1 hour with 10.5 parts of zinc oxide at 80° C. to convert the excess sodium sulfhydrate to zinc sulfide. The reaction mixture is finally reacted with a solution of 46 parts of zinc sulfate ($ZnSO_4 \cdot 7H_2O$) until all of the sodium salt of pentachlorothiophenol is converted to the corresponding zinc salt which is filtered off and dried. The final product is an odorless white powder which analyzes 70% zinc pentachlorothiophenol and 30% of a mixture of zinc oxide and zinc sulfide. Without further purification this product is an excellent peptizing agent for natural or synthetic rubbers.

The free pentachlorothiophenol when isolated prior to the reaction with zinc oxide in the manner described in Example 2 is also an effective peptizing agent for rubber.

*Example 2*

A mixture of 43 parts of hexachlorobenzene and 67 parts of methanol is heated with various amounts of sodium sulfhydrate (65% NaSH) in a stainless steel pressure vessel for 4 hours at 140° C.

The reaction products are discharged into a solution of 6 grams of sodium hydroxide in 400 cc. of water, filtered from any insoluble material consisting essentially of unreacted hexachlorobenzene, and the pentachlorothiophenol is precipitated with acid. The table below gives the mol ratios of the reactants and per cent conversion obtained on the basis of hexachlorobenzene actually consumed.

| Mol Ratio of Sodium Sulfhydrate to Hexachlorobenzene | Percent Conversion to Thiols | Percent Sulfur in Recrystallized Thiol |
|---|---|---|
| 1.5:1 | 78 | 18.1 |
| 2.0:1 | 99.5 | 18.8 |
| 2.5:1 | 100 | 12.7 |

Calculated amount of S for pentachlorothiophenol: 11.35.

These examples show that low mol ratios give predominantly dithiol derivatives, while higher mol ratios give the pentachloromonothiophenol.

The low sulfur compound on further recrystallization yields pure pentachlorothiophenol with a melting point of 243° C.

*Example 3*

A mixture of 43 parts of hexachlorobenzene, 90 parts of methanol and 32.4 parts of sodium sulfhydrate (65% A. I. flakes) are heated for 8 hours to 120° C. and then worked up as in Example 2. An essentially quantitative conversion to pentachlorothiophenol is obtained.

The same results are obtained when the same mixture is heated for 4 hours to 130° or one and three-quarter hours to 140° C.

*Example 4*

A mixture of 43 parts of hexachlorobenzene, 32 parts of sodium sulfhydrate (70% flakes) is heated with various amounts of methanol for 4 hours to 140° C. and then the conversion to thiophenol determined as described in Example 2.

| Cc. Methanol | Percent Conversion | Percent Sulfur in Thiophenol |
|---|---|---|
| 85 | 100 | 12.7 |
| 57 | 61 | 12.1 |
| 29 | 21 | 11.8 |

The use of larger amounts of alcohol and therefore increased solubility favors increased conversion and the sulfur content of the final product is not significantly affected.

*Example 5*

A mixture of 37.8 parts of pentachlorobenzene, 32.4 parts of sodium sulfhydrate (70% flakes) and 90 parts of methanol is heated for 3 hours at 130° C.

After this time 91% of the pentachlorobenzene is converted to a mixture of isomeric tetrachlorothiophenols, a new odorless, white crystalline product with a melting range of from 103° to 106° C. Analysis shows 59.1% Cl and 12.8% S, whereas theory for the monothiophenol is 57.3% Cl and 12.9% S.

Rubber is effectively peptized with this new tetrachloromonothiophenol.

*Example 6*

A mixture of 32.4 parts of 1,2,3,4-tetrachlorobenzene, 32.4 parts of sodium sulfhydrate (70% flakes) and 90 parts of methanol is heated for 3 hours to 150° C. After working up the reaction mixture as in Example 2 it will be established that approximately 86% of the tetrachlorobenzene had been converted to thiol derivatives. The thiophenol obtained on acidification with HCl analyzes 48.4% Cl and 17.6% S, as compared to theory for $C_6H_3Cl_3S$ which is 49.8% Cl and 14.9% S.

The analysis shows the product is predominantly a trichlorothiophenol with some dichlorophenyldithiol, the mixture melting at 46° to 48° C.

*Example 7*

A mixture of 32.4 parts of 1,2,4,5-tetrachlorobenzene, 32.4 parts of sodium sulfhydrate (70% flakes) and 90 parts of methanol is heated for 3 hours to 170° C.

Working up of the reaction product as described in Example 2 shows that 88% of the tetrachlorobenzene has been converted to thiol derivatives. Analysis shows that the product is essentially a dichlorophenyldithiol having a melting range of from 125° to 135° C., chlorine 39.1% and sulfur 26.3%, whereas theory for this compound is 33% chlorine and 30.3% sulfur.

If the above reaction is carried out by heating for 6 hours to 150° C., the conversion to thiols is 44% complete while after 3 hours at 130° only 12% of the tetrachlorobenzene is reacted.

*Example 8*

The following runs show the effects of varying amounts of polysulfides in sulfhydrate.

A mixture of 43 parts of hexachlorobenzene, 32.4 parts of sodium sulfhydrate (70% flakes containing 0.4% polysulfide S) and 90 parts of methanol is heated for 2½ hours at 130° C. in a stainless steel pressure vessel.

The crude pentachlorothiophenol is isolated by pouring the reaction mixture into water, filtering from traces of impurities and then acidifying with hydrochloric acid.

This reaction, when repeated with other samples of sodium sulfhydrate which contained higher amounts of polysulfide S, shows the results of an increase in polysulfide sulfur when present in the sulfhydrate. It will be noted that there is an increase in the amount of tetrachlorodithiol derivatives in the resulting products.

| Percent Polysulfide S in NaSH | Percent Sulfur in Thiol |
|---|---|
| 0.4 | 12.3 |
| 1.2 | 13.5 |
| 2.2 | 16.6 |
| 3.2 | 26.2 |
| 4.2 | 28.6 |

A sodium sulfhydrate low in polysulfide sulfur should be used if a high yield of the monothiol is desired. The low sulfur compounds (12.3%, 13.5% S) readily yield on crystallization a pure pentachlorothiophenol with a melting point of 243° C. The higher sulfur compounds (26.2%, 28.6% S) on crystallization give slightly yellow crystals with a melting range of 230° to 240° C. These crystals are apparently mixtures of isomeric tetrachlorobenzenedithiols. They show on analysis 50.3% Cl and 22.8% S, whereas theory for these diols is 50.8% Cl and 22.8% S.

These tetrachlorobenzenedithiols and their zinc salts are good peptizing agents for natural and synthetic elastomers. These tetrachlorobenzenedithiols and their zinc salts are claimed in a continuation-in-part of the present application, Serial No. 425,301, filed April 23, 1954.

*Example 9*

The reaction of hexachlorobenzene with sodium sulfhydrate may also be carried out at atmospheric pressure by using a higher boiling solvent such as ethylene glycol.

When 43 parts of hexachlorobenzene are reacted for 8 hours at 120° C. with 36 parts of NaSH (65% flakes) in the presence of 120 parts of ethylene glycol, a yield of 14% of pentachlorothiophenol is obtained.

*Example 10*

Since ethylene glycol is a good solvent for sodium sulfhydrate but a poor solvent for hexachlorobenzene, the use of a mixture of ethylene glycol with benzene, toluene or xylene will be found advantageous.

A mixture of 43 parts of hexachlorobenzene, 36 parts of NaSH (65% flakes), 120 parts of ethylene glycol and 50 parts of xylene is heated for 2 hours on reflux at 150° C. A yield of 83% of pentachlorothiophenol is obtained.

In a similar reaction, a mixed solvent comprising 22% of benzene and 78% of methanol is used in which the hexachlorobenzene and sodium sulfhydrate are heated to 130° C. for 2½ hours, resulting in a 95% conversion to pentachlorothiophenol.

The essential solvent requirement for carrying out the reaction is the use of solvents or solvent mixtures which dissolve the two reactants, NaSH and polychlorobenzene, in substantial amounts.

I claim:

1. A process for preparing polychloromonothiophenols containing from 3 to 5 chlorine atoms, which comprises reacting an alkali metal sulfhydrate with a polychlorobenzene containing from 4 to 6 chlorine atoms in a mol ratio of from 2:1 to about 3:1 at temperatures of from 100° to 170° C. in an inert organic solvent in which both reactants are soluble at the temperature employed.

2. A process for preparing polychloromonothiophenols containing from 3 to 5 chlorine atoms, which comprises reacting an alkali metal sulfhydrate with a polychlorobenzene containing from 4 to 6 chlorine atoms in a mol ratio of from 2:1 to about 3:1 at temperatures of from 100° to 170° C. in methyl alcohol, the amount of methyl alcohol employed being sufficient to dissolve a substantial quantity of the polychlorobenzene at the temperature of the reaction.

3. A process for preparing tetrachlorothiophenol which comprises heating sodium sulfhydrate and pentachlorobenzene in a mol ratio of from 2:1 to about 3:1 at temperatures of from 100° to 170° C. in methyl alcohol, the amount of methyl alcohol employed being sufficient to dissolve a substantial quantity of the pentachlorobenzene at the temperature of the reaction.

4. A process for preparing pentachlorothiophenol which comprises heating sodium sulfhydrate and hexachlorobenzene in a mol ratio of from 2:1 to about 3:1 at temperatures of from 100° to 170° C. in methyl alcohol, the amount of methyl alcohol employed being sufficient to dissolve a substantial quantity of the hexachlorobenzene at the temperature of the reaction.

References Cited in the file of this patent

UNITED STATES PATENTS

| 1,825,662 | Hale | Oct. 6, 1931 |
| 2,413,531 | Verbane | Dec. 31, 1946 |
| 2,490,257 | Crowley et al. | Dec. 6, 1949 |
| 2,695,898 | Lober et al. | Nov. 30, 1954 |

FOREIGN PATENTS

| 875,655 | France | June 29, 1942 |

OTHER REFERENCES

Mills: Jour. Chem. Soc. (London), part 1, page 175 (1936).

Beilstein: vol. VI, 2nd ed. (1944), page 830.